Sept. 19, 1950 — D. E. GRAY — 2,522,713
SMALL MICA ASSEMBLY
Filed Dec. 19, 1947 — 2 Sheets-Sheet 1
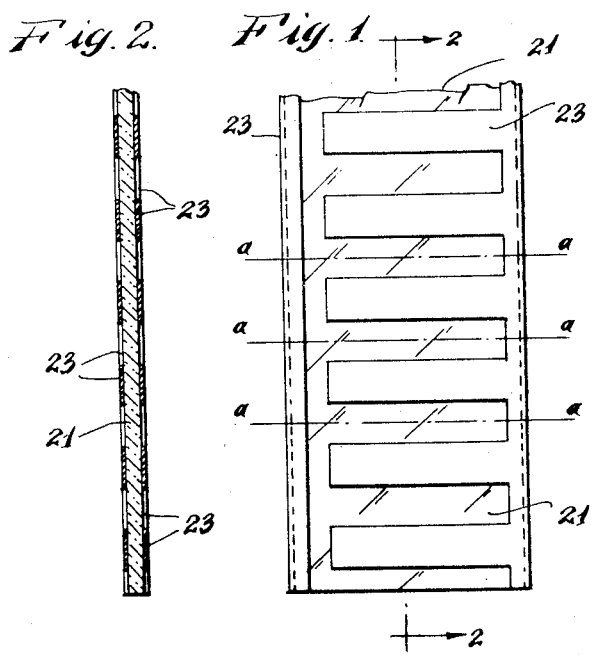
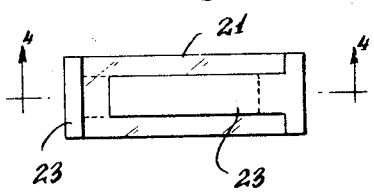
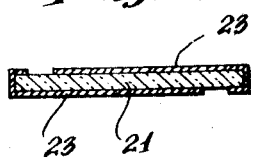
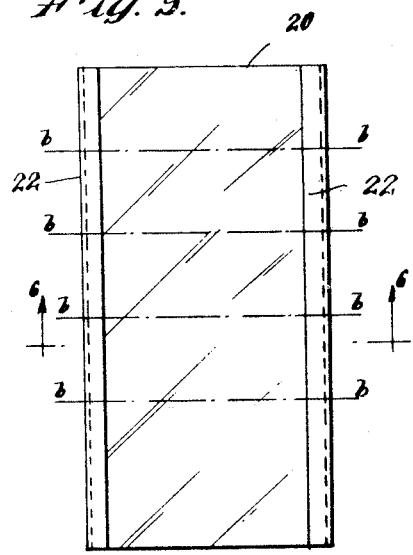
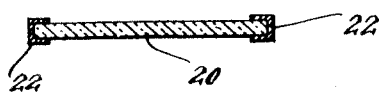
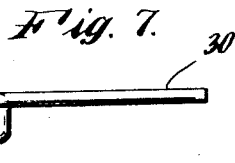
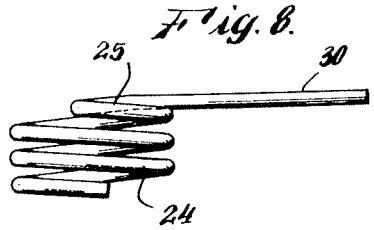
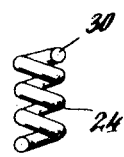
INVENTOR.
Donald E. Gray
BY
ATTORNEY.

Sept. 19, 1950  D. E. GRAY  2,522,713
SMALL MICA ASSEMBLY
Filed Dec. 19, 1947  2 Sheets-Sheet 2
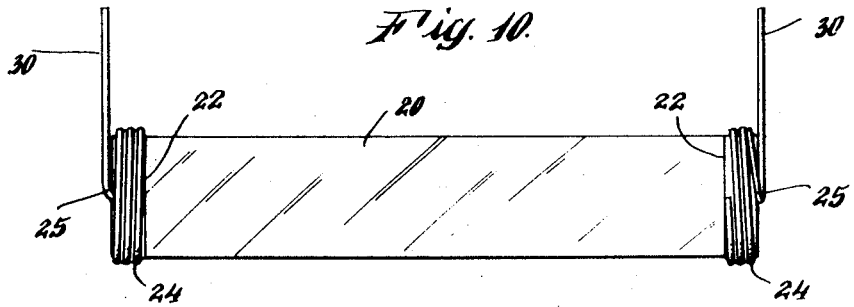
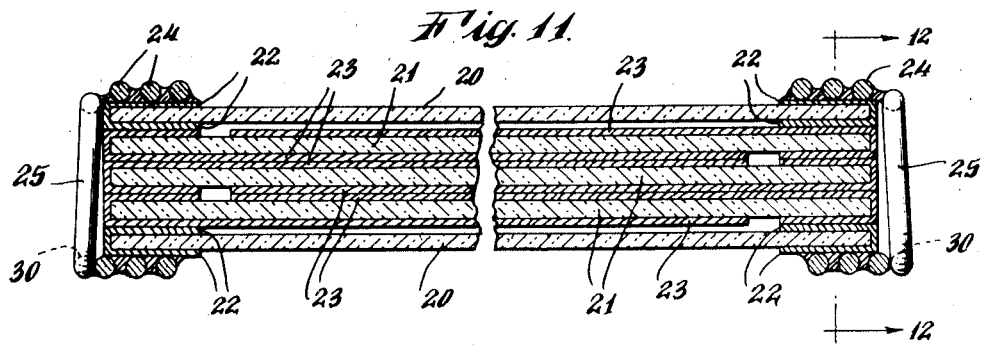
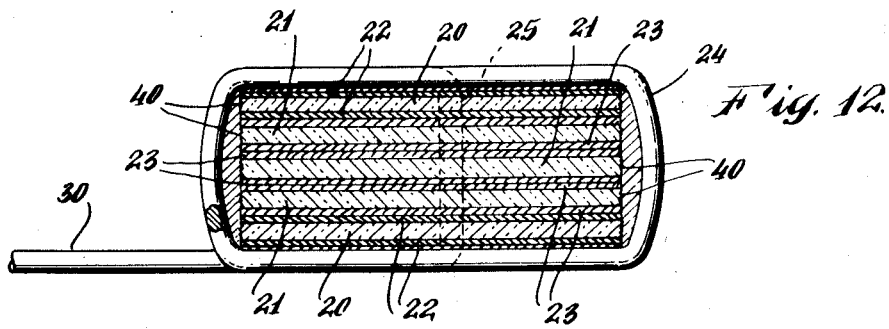
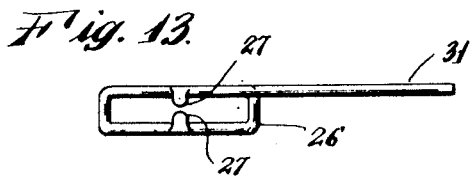
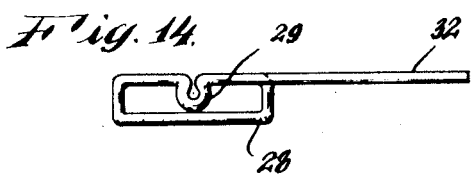
INVENTOR.
Donald E. Gray
BY
ATTORNEY.

Patented Sept. 19, 1950

2,522,713

UNITED STATES PATENT OFFICE 2,522,713

SMALL MICA ASSEMBLY

Donald E. Gray, Teaneck, N. J., assignor to Cornell-Dubilier Electric Corporation, South Plainfield, N. J., a corporation of Delaware Application December 19, 1947, Serial No. 792,750

2 Claims. (Cl. 175—41)

This invention relates to electrical capacitors of that type in which mica or a mica-like material, all herein termed "mica," is employed as the dielectric material. The invention is also concerned with methods of assembling such capacitors. Specifically the invention deals with certain features of capacitor construction which are of particular advantage and usefulness in the assembly, and assembled construction, of relatively small or even minute sizes of electrical capacitors of the mica type.

As will more particularly appear in the following description of the invention, the commercial assembly of a stacked capacitor body built of thin mica sheets or layers bearing on their surfaces coatings of conducting metal, presents difficulties which greatly increase as the size of that body is reduced. The clamping together of very small pieces of mica and the building of those pieces in the permanent form of a capacitor body presents difficulties not encountered when the capacitor stack is made of larger pieces. There is no critical size at which these assembly difficulties first appear. They are indeed inherently present in the larger sizes of capacitors where the surfaces presented allow a wider choice of means for compacting and holding the relatively brittle and inflexible mica laminations in set relationship. However, when the total volume of the capacitor body approaches .01 cubic inch or lies below that volume, it is a rare occasion where it is possible to utilize the clamping and holding arrangements commonly used in the manufacture and assembly of larger sized capacitors.

It is to these difficulties that the present invention is specifically directed, but the herein described capacitor structures and methods of assembly will at times be found useful in the manufacture and assembly of larger capacitors. In general, however, it is the object of this invention to provide an improved capacitor structure which is primarily suited to very small mica capacitors and which enables rapid and relatively inexpensive assembly of these small capacitors. Other and related objects will be apparent from the following description of the invention.

The invention will be described with reference to the accompanying drawings, in which:

Fig. 1 is a view of one side of a strip of mica coated with conducting metal and adapted to be cut, as along lines $a$—$a$, into elements which may be stacked to form a capacitor body;

Fig. 2 is a cross section through the mica strip of Fig. 1 taken at the line 2—2;

Fig. 3 is a view of one side of an element cut from the strip of Fig. 1;

Fig. 4 is a cross section of the element of Fig. 3 taken at the line 4—4;

Fig. 5 is a view of one side of another metal coated mica strip from which capacitor body elements are cut, as along lines $b$—$b$, the side not shown being identical with the side shown;

Fig. 6 is a cross section through the strip shown in Fig. 5;

Figs. 7, 8 and 9 are end, side and edge views, respectively, of a combined terminal and capacitor body clamping member;

Fig. 10 is a view of a fully assembled mica capacitor embodying the principles of this invention;

Fig. 11 is a longitudinal view, in section, taken through all of the elements of the body of the capacitor shown in Fig. 10;

Fig. 12 is a cross section view through the capacitor shown in Fig. 11 taken as indicated by the section line 12—12 on said figure; and Figs. 13 and 14 are end views of alternative forms of capacitor body clamping member.

This invention is concerned with those mica capacitors in which the conducting element is formed of a layer of conducting metal intimately attached to and firmly positioned on the mica. There are various ways in which this may be accomplished, such as by applying a reducible metal oxide to the mica surface and thereafter reducing the oxide to metal, or by applying metallic flakes to the mica surface. In practice silver is usually employed as the conducting metal.

The first and preliminary steps to the assembly of these small mica capacitors involve the preparation of suitably shaped and sized mica pieces which may be "stacked" or assembled to form the capacitor body. Of course, such pieces must bear on their surfaces the conducting metal coating which, in final assembly, forms the electrodes of the condenser. These general preliminary steps are well known to the art but in one particular form are discussed and explained herein, because I have found that if the mica pieces bear metal coatings of certain configuration, the results obtainable by the practice of the further aspects of my invention are considerably enhanced.

Referring now to Figs. 1, 2, 3 and 4, I prefer to form the mica pieces which are to comprise the inner elements of the capacitor body in the following manner: The operator first selects a mica strip 21 of proper cross section and of any suitable length. On this strip 21 the metal coatings 23 are placed. These metal coatings or layers cover the long edges of the strips and extend inwardly on both sides thereof to form coated marginal areas. On one side of the strip and extending inwardly from one of said marginal areas are spaced transverse areas of coating which extend toward, but not to, the opposite marginal area. On the other side of the strip 21 this pattern of coating is repeated but in this case the transverse areas extend from the other marginal area. The strip thus coated is then cut, or sheared, along lines such as indicated by lines $a$—$a$ on Fig. 2, the result being a number of mica pieces such as shown at Figs. 3 and 4. It will be noted that each of the cut pieces has cut or sheared uncoated longitudinal edges and metal coated end edges and that on each side of said mica piece, but extending from opposite edges thereof, the coating is roughly in the form of a T the top of which extends along said edge and the leg of which extends outwardly and perpendicularly of said edge to a joint short of contact with the coated marginal area extending from the other coated edge. It will be further noted that the T-shaped coating on each side of the mica member is electrically distinct from the T-shaped coating on the other side.

Referring now to Figs. 5 and 6, I prefer to form the mica pieces which comprise the outer layers or "backing" plates of the capacitor body in the following manner: The operator first selects a mica strip 20, usually somewhat thicker than the strip 21 but otherwise preferably of the same cross sectional dimensions. The strip 20 may be of any desired length. On this strip are placed the metal coatings or layers 22 which, as shown, cover opposite longitudinal edges of the strip 20 and extend inwardly therefrom on each side of the strip to form coated marginal areas. The strip, thus coated, is then cut, or sheared, along lines such as indicated by the lines b—b in Fig. 5, the result being a number of small mica pieces defined by cut, or sheared, longitudinal edges and coated end edges.

The elements cut from strip 21 and strip 20 are then conventionally stacked into a pile which forms the capacitor body, the pieces cut from strip 21 forming the inner elements of the body and the pieces cut from strip 20 forming the outer elements, all as best shown in Fig. 11. It will be noted that the body thus formed is defined by two opposite metal coated end surfaces, two opposite sides which include the cut, or sheared, edges of the mica elements or layers and another set of opposite sides defined largely by the outer surfaces of the outer mica layers but defined in part by the marginal coated areas 22 disposed on those surfaces.

It is at this point in assembly operations, i. e., the formation of the stack, that the means and procedures generally used for the assembly of normally sized capacitor bodies becomes inefficient or virtually impossible of performance in the assembly of very small capacitor bodies.

Assume, for example, that the capacitor body elements, such as the elements shown in Fig. 3, are but .375 inch in length and .125 inch in width, with an over-all thickness of .003 to .01 inch, the outside or backing strips being, as is usually the case, thicker than the inner mica strips. A capacitor body formed by stacking five such elements will be but .375 inch in length, .125 inch in width and, say, about .03 to .1 inch in thickness. The body thus formed must now be rigidly clamped together so that electrical contact between adjacent metal layers will not be disturbed in use and so that the elements of the body will be permanently fixed in unvarying special relationship one to the other Likewise terminals allowing the connection of the capacitor body in an electrical circuit must be provided in conducting relationship to the conducting metal layer presented on the surfaces of the outer mica elements of the stacked capacitor body. In small capacitors of the sizes above indicated it is difficult to provide such terminal connections without subjecting the mica layers of the capacitor, during handling and use of the capacitor, to stresses which may be well beyond any stress which the thin, brittle mica plates will stand. To so clamp and fix the elements of the stack, I form a clamping element 24 composed of convolutions of conducting metal in the general shape of round or flat wire, band or strip. This element is formed to have the same general shape as the end of the stacked capacitor body and to fit rather closely therearound, preferably so that the convolutions are in contact with two opposite sides of the rectilinear capacitor body. Such clamping elements 24 may be preformed, as on a mandrel, or may be wound on the stack at the time of assembly. While the mica elements of the stack are held closely together and in proper alignment, such a clamping element is slipped over each end or wound on each end of the capacitor body. In the next step of assembly the operator flows sufficient conducting molten solder around the surfaces of the convolutions of the clamp and over the metal surfaces adjacent thereto to form a union therebetween. At or immediately prior to this step heat may be applied to the clamping element.

The clamping elements may take various specific forms, a preferred form being shown in Figs. 7, 8 and 9, in which an additional feature of importance is incorporated. In this form, it will be noted, the last or outer convolution 25 is of shorter diameter than the other or equisized convolutions which are shaped to receive the capacitor body, with the effect that when the clamping element is assembled by the operator on the end of the capacitor body the convolution 25 forms an element extending across the ends of the stacked elements. When this form of clamping element is assembled on the condenser the operator, in addition to soldering the body receiving convolutions to the outer metal surfaces of the capacitor, likewise solders the convolution 25 to the metal surfaces at the end of the capacitor, the convolution 25 thus forming means extending across the ends of the stacked elements by which the stacked elements may be securely anchored against endwise movement or shifting. The shortened convolution 25 of the clamp shown in Figs. 7, 8 and 9 is, in effect, an abutment positioned to lie at least partly across the end of the capacitor stack on which the clamp is placed, and this abutment may take various forms, such as the ears 27 struck from the wire that forms the convolutions of the clamp shown in Fig. 13, or the loop 29 which is formed in the outer or end convolution of the clamp shown in Fig. 14. In all of the clamping elements thus shown the end of the wire which forms the last or outer convolution of the clamping element may be extended, if desired, to form the terminal, such as the terminal portion 30 shown in Figs. 5 and 6 and similar terminal portions 31 and 32 shown, respectively, in Figs. 13 and 14. In some cases, however, the convolutions may be of substantially equal diameter and, indeed, effective results have been obtained where the clamp embodies no convolution or other element shaped to extend or lie across the end of the stack. When the clamping element contains no abutment which will lie over an area of the end of the stack it is sometimes desirable to flow solder over the stack end to form a bridging element or layer.

A preferred form of the invention is illustrated in Figs. 11 and 12, the assembly shown in these figures possessing, in addition to the features just described, another important feature. It will be noted that the mica elements 20 and 21 are formed by cutting or shearing from strips of indefinite length. As is well known, any mica strip of sufficient thickness to be handled is composed of extremely thin lamellae. When the strip is sheared, or cut, through these lamellae, the cutting action tends to separate the edges thereof so that the resulting cut edge is not perfectly smooth but rather tends to be jagged or serrated. This condition is shown, in exaggerated form, in Fig. 12, where the edges 40 of the mica are shown as rough or uneven. In the preferred practice of my invention I take advantage of these rough mica edges by so forming the convolutions of the clamping member 24 that those portions of the convolutions opposite the cut uncoated edges of the mica elements are slightly spaced therefrom to leave an opening or area into which the operator may insert the solder 41. The result is that the solder thus applied flows into the serrations of the edge of the mica strips and further insures the formation of a compact permanent joint between the clamping member and the stacked elements of the capacitor body.

Considering the various elements just described, the advantages of this invention become clear.

As stated above, the operator in the preferred practice of the invention first forms the capacitor stack and then slips over the end thereof, or winds on the end thereof, a clamping member such as the member 24. As the next step, the operator, in the preferred practice of the invention, applies heat to this clamping element and at the same time, or soon thereafter, flows solder into the spaces between the clamping member and the mica stack. The mechanical joint thus formed is one in which the stack elements are rigidly held by virtue of the fact that the solder on cooling contracts and tends to press the capacitor stack elements together. At the same time the molten solder flows into the minute crevices or interstices of the rough mica edges and solidifies therein. The resulting joint is, therefore, in effect a mechanical one between the clamping member and the solder, on the one hand, and the solder and the stack elements, on the other, so that any pull or any stress that is exerted upon the clamping member when that member is subsequently used as a lead or connected to a lead, does not have direct effect upon the very thin and very brittle mica laminations or upon the structurally weak metal layers deposited on the mica.

It is not necessary in carrying out this operation to separately heat the clamping element and, in fact, an efficient joint will be formed whether or not the clamping element is separately heated. It is believed, however, that the consequent expansion and contraction resulting from the definite application of heat to the clamping element results in a more efficient final joint.

Thus by providing a clamping member of light, wirelike convolutions of metal formed to slip over the end of a capacitor body composed of stacked mica elements, and by bonding the convolutions of the clamp to the metal coated surfaces of the mica members, I have provided a simple, inexpensive method of permanently holding the stacked capacitor body in its predetermined form. It will be further observed that this method of assembly is particularly adapted to the manufacture of capacitors of very small dimensions, since assembly does not, as heretofore, depend upon the use of clamps having flat pressure surfaces or being otherwise unsuited to the clamping of very small bodies or surfaces.

While the pattern of the conducting metal coating on the mica elements may, in the wider aspects of this invention, be of any convenient form which will insure in the finished capacitor body at least two sets of electrodes of the capacity desired, it will be apparent that the form of the coated areas shown and described in the illustrated embodiment of the invention are particularly adapted for use in combination with the clamping elements and the solder bodies which serve to hold the capacitor body in the fixed and comparatively stress-free relationship just described. It will be further noted that the principles of this invention are particularly directed to mica or mica-like materials, since such materials are capable of withstanding, without harmful effect, applied heat of the order of about 500 degrees Fahrenheit.

Having thus described my invention, I claim:

1. An electrical capacitor comprising a plurality of flat equisized pieces of mica having sheared edges and bearing on a portion of their surfaces an intimately attached layer of conducting metal, said mica pieces being arranged to form a stacked body presenting opposite end surfaces, a set of opposite sides which include the sheared edges of said mica sheets and another set of opposite sides defined largely by the surfaces of the outer mica pieces but defined, adjacent the ends of said pieces, by outer surfaces of conducting metal, clamping members composed of wire-like metal convolutions sized to receive and contain a portion of said stacked body and an abutment member positioned to contact an end surface of the body received in said convolutions, one of said clamping members being positioned over each end of said body so that the convolutions thereof lie over said outer surfaces of conducting metal and the abutment is in contact with the adjacent end surface of the body and conducting metal solder disposed to connect the convolutions of each such clamping member to the outer conducting surface adjacent thereto and to fill the space between said convolutions and those sides of the body which include the sheared edges of said mica sheets.

2. An electrical capacitor comprising a plurality of flat equisized metal coated pieces of mica arranged to form a stacked capacitor body presenting opposite ends and opposite sides which include the edges of said mica pieces, clamping means composed of wire-like metal convolutions positioned over each end of said body, the convolutions of said members being sized to receive and contain a portion of said stacked body and being shaped to extend outwardly from said opposite sides and metal solder positioned to attach the convolutions of said clamping members to said stacked body and to fill the space between the inner surfaces of said convolutions and said opposite sides.

DONALD E. GRAY.

REFERENCES CITED

The following references are of record in the file of this patent:

UNITED STATES PATENTS

| Number | Name | Date |
|---|---|---|
| 1,892,755 | Scheppmann | Jan. 3, 1933 |
| 2,011,555 | Burlingame | Aug. 13, 1935 |
| 2,054,478 | Heyman | Sept. 15, 1936 |
| 2,398,088 | Ehlers | Apr. 9, 1946 |

FOREIGN PATENTS

| Number | Country | Date |
|---|---|---|
| 550,130 | Great Britain | Dec. 23, 1942 |